No. 723,129. PATENTED MAR. 17, 1903.
J. BONDURANT.
WEED DESTROYER.
APPLICATION FILED AUG. 20, 1902.
NO MODEL.
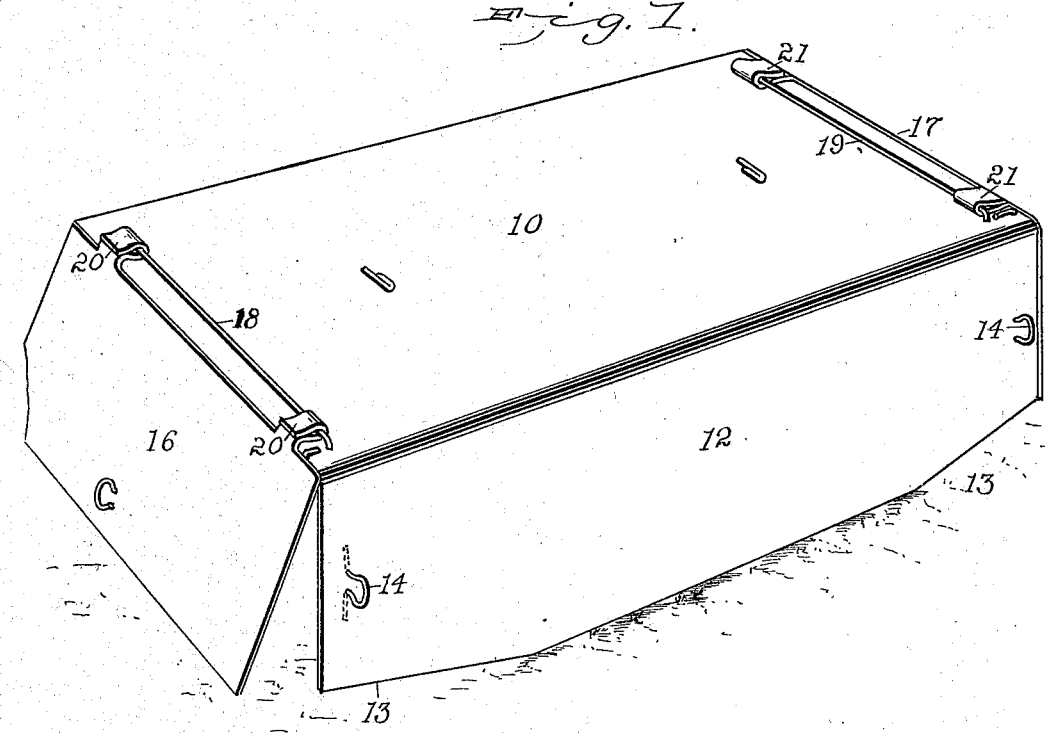
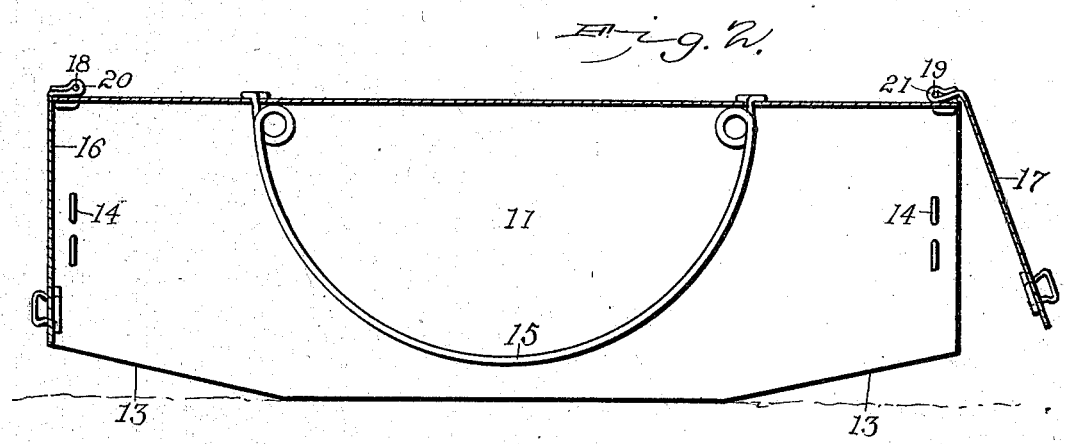
Witnesses
E. F. Stewart
C. N. Woodward
J. Bondurant, Inventor.
by C. A. Snow & Co.
Attorneys

UNITED STATES PATENT OFFICE.

JOHN BONDURANT, OF MONTEREY, KENTUCKY.

WEED-DESTROYER.

SPECIFICATION forming part of Letters Patent No. 723,129, dated March 17, 1903.

Application filed August 20, 1902. Serial No. 120,418. (No model.)

*To all whom it may concern:*

Be it known that I, JOHN BONDURANT, a citizen of the United States, residing at Monterey, in the county of Owen and State of Kentucky, have invented a new and useful Weed-Destroyer, of which the following is a specification.

This invention relates to devices employed for the purpose of destroying noxious weeds, superfluous grass, and other growths in the preparation of plant-beds, and has for its object the production of a simply-constructed device which may be readily moved from place to place over the ground while the fire is contained therein; and the invention consists in a casing, preferably of sheet metal, closed at the sides and top and open at the bottom and provided with movable closures at the ends and adapted to contain burning material.

The invention further consists in an inclosing casing, preferably of sheet-iron, with closed top and sides and movable closures at the ends and containing means for supporting the burning material within the device, so that in moving it from place to place the burning material may be carried with it.

Other novel features of the invention will appear in the annexed description and be specified in the claims following.

In the drawings illustrative of the invention, Figure 1 is a perspective view of the device complete. Fig. 2 is a longitudinal sectional elevation.

The device may be constructed of any required size and of any suitable material, but will preferably be of sheet metal of sufficient strength to withstand the strains to which it will be subjected.

The device consists in a body portion comprising a top member 10, having depending sides 11 12 and formed in one single piece of sheet metal, preferably, although it may be made in two or more pieces suitably secured together.

The depending sides 11 12 will be inclined at the ends, as at 13, so that when the device is drawn over the ground the inclined portions will cause it to freely run over obstructions, the device thus being sled-like in its outline.

Suitable loops 14 will be connected to the side members 11 12 at their ends to provide for the attachment of the horses or other power by which the device is drawn from place to place.

Within the casing formed by the members 10 11 12 is supported a depending spring-loop 15, adapted to receive the material used for burning, which is preferably straw or like material, and clamp it between said loop and the top of the casing, so that when the structure is moved from place to place the burning material will be securely held and carried with it and not be dragged over the ground. This is a very important feature of the invention and adds materially to the efficiency of the device and greatly economizes in the fuel employed.

The fuel employed in devices of this character is generally dried stalks of weeds, hay, leaves, and similar products, and by arranging them in bunches they can be supported in the loop 15 until entirely consumed.

The ends of the device are provided with movable closures 16 17, preferably hinged at their upper edges to the casing, so that they can be folded up over the casing to provide for the admission of air and the escape of the smoke and also for the introduction of fuel when loose fuel is employed.

Attached to the ends of the top member 10 are transverse stay-rods 18 19, secured by their ends near the corners of the top 10, as shown. These stay-rods serve to support and stiffen the device and prevent warping and buckling by the heat. The stay-rods 18 19 are also utilized as pintles for the hinges of the closures 16 17, the hinges being formed by sections of the closures being extended therefrom and bent around the stay-rods, as shown at 20 21. This makes a very simple, convenient, and effective hinge connection.

The extensions 20 21 are shown formed integral with the closures 16 17, respectively, which will be the preferable manner of forming this feature of the device; but I do not wish to be limited to this precise construction, as the sections 20 21 may be formed separately from the closures and attached thereto, if preferred. This makes a very simple, cheap, and convenient device for the purpose intended and may be employed in any locality where required by simply inserting a mass of fuel material within the loop 15, igniting it, and opening the closures 16 17 to a sufficient extent to admit the necessary air at one end and permit the escape of the smoke at the other and drawing the device slowly over the ground, either by horse or hand power, and pausing as long as required to subject the ground beneath the device to the influence of the fire. The device may thus be employed over every particle of the ground and the ground treated uniformly or some portions of the ground treated to a greater heat than the others, if required.

By this simple device plant-beds may be thoroughly treated to the action of the heat to any required extent and the greatest possible benefit derived from the fuel employed. Thus every particle of the heat generated will be utilized at points required and no waste of fuel will take place.

The device may be made of any size, as before stated, and may be modified in minor particulars without departing from the principle of the invention or sacrificing any of its advantages.

Having thus described the invention, what is claimed is—

1. A weed-destroyer comprising a casing open at its bottom and provided with draft-regulating means, and a spring fuel-supporting clamp mounted within the casing.

2. A weed-destroyer comprising a casing open at its bottom and having a spring-actuated fuel-clamping loop depending from the top thereof.

3. An apparatus for burning and preparing plant-beds consisting of a casing closed at the top and sides, transverse stay-rods connected to the casing, and closures to the ends of the casing having hinge-leaves projecting therefrom and movably engaging said stay-rods, whereby the stay-rods serve as pintles to the hinge-leaves, substantially as described.

In testimony that I claim the foregoing as my own I have hereto affixed my signature in the presence of two witnesses.

JOHN BONDURANT.

Witnesses:
R. E. VORIES,
I. J. KEMPER.